United States Patent [19]

Klosiewicz

[11] Patent Number: 4,485,208

[45] Date of Patent: * Nov. 27, 1984

[54] PLASTICIZED POLYDICYCLOPENTADIENE AND A METHOD FOR MAKING THE SAME

[75] Inventor: Daniel W. Klosiewicz, Newark, Del.

[73] Assignee: Hercules Incorporated, Wilmington, Del.

[*] Notice: The portion of the term of this patent subsequent to Mar. 13, 2001 has been disclaimed.

[21] Appl. No.: 552,195

[22] Filed: Nov. 15, 1983

Related U.S. Application Data

[62] Division of Ser. No. 378,449, May 14, 1982.

[51] Int. Cl.$^3$ .............................................. C08K 5/10
[52] U.S. Cl. .................................. 524/773; 524/296; 524/297; 524/776; 526/142; 526/154; 526/166; 526/169
[58] Field of Search ............... 524/776, 296, 297, 553, 524/554, 773; 526/142, 166, 169

[56] References Cited

U.S. PATENT DOCUMENTS

| | | | |
|---|---|---|---|
| 2,259,180 | 10/1938 | Schoenfeld et al. | 260/32 |
| 2,674,586 | 4/1954 | Welch | 524/297 |
| 2,689,836 | 3/1951 | Bier | 260/30.6 |
| 3,575,947 | 4/1971 | Crain | 526/154 |
| 3,624,060 | 11/1971 | Judy | 526/154 |
| 3,639,371 | 2/1972 | Marshall et al. | 526/154 |
| 3,776,895 | 12/1973 | Ven et al. | 526/172 |
| 3,816,384 | 6/1974 | Streck et al. | 526/154 |
| 4,025,708 | 5/1977 | Minchak et al. | 526/143 |
| 4,136,247 | 12/1977 | Tenney et al. | 526/283 |
| 4,136,248 | 12/1977 | Tenney | 526/283 |
| 4,136,249 | 12/1977 | Tenney et al. | 526/283 |
| 4,178,424 | 12/1978 | Tenney et al. | 526/283 |
| 4,400,340 | 8/1983 | Klosiewicz | 524/856 |

FOREIGN PATENT DOCUMENTS 556596  4/1958  Canada .............................. 526/154

OTHER PUBLICATIONS

The "Technology of Plasticizers", by Sears et al., pp. 1008, 1034, 1037, 1044.

Primary Examiner—Joseph L. Schofer
Assistant Examiner—N. Sarofim
Attorney, Agent, or Firm—Dale R. Lovercheck

[57] ABSTRACT

Incorporation of an ester plasticizer having a solubility parameter from about 7.8 to about 10.2 (cal/cc)$^{\frac{1}{2}}$ increases the flexibility and impact strength of poly(dicyclopentadiene). In a preferred embodiment of the method for poly(dicyclopentadiene) synthesis, the plasticizer is incorporated into at least one of two parts of a metathesis-catalyst system: a catalyst/monomer solution or an activator/monomer solution. The two parts are then combined in the mixing head of a reaction injection molding machine and injected into a mold where the reaction mixture rapidly sets up into a thermoset polymer with greater flexibility and impact strength than is found in the corresponding unplasticized poly(dicyclopentadiene).

8 Claims, No Drawings

PLASTICIZED POLYDICYCLOPENTADIENE AND A METHOD FOR MAKING THE SAME

This application is a division of application Ser. No. 378,449, filed May 14, 1982.

BACKGROUND OF THE INVENTION

This invention relates to a novel dicyclopentadiene (hereinafter referred to as DCPD) polymer into which a plasticizer has been incorporated. In particular, it relates to the addition of an ester plasticizer having a solubility parameter from 7.8 to about 10.2 $(cal/cc)^{1/2}$ to a thermoset poly(DCPD) which is formed via a metathesis-catalyst system. In a preferred embodiment the polymer is formed when two solutions, at least one of which contains plasticizer, one a catalyst/monomer solution and the other an activator/monomer solution, are combined in a reaction injection molding machine and then injected into a mold where polymerization rapidly occurs.

Poly(DCPD) is a crosslinked polymer well suited in a wide variety of applications. One of the great advantages offerered by poly(DCPD) is that it can be used to form products via reaction injection molding (hereinafter referred to as RIM).

Reaction injection molding is a process for in-mold polymerization which involves the mixing of two or more low viscosity reactive streams. The combined steams are then injected into a mold where they quickly set up into a solid infusible mass. RIM is especially suited for molding large intricate objects rapidly and in low cost equipment. Because the process requires only low pressures, the molds are inexpensive and easily changed. Furthermore, since the initial materials have low viscosity, massive extruders and molds are not necessary and energy requirements are minimal compared to the injection molding or compression molding commonly used. For a RIM system to be of use in forming a plasticized polymer, the plasticizer must be added before the material sets up. Therefore, it is critical that the plasticizer not interfere with the polymerization reaction.

The advantage of adding plasticizers to poly(DCPD) is a modification of the polymer's physical properties. Numerous applications of poly(DCPD), e.g. highly impact resistant fascia and bumpers for automobiles, require a softer, more elastic material, having a higher impact resistance and greater flexibility than is obtainable with the unmodified polymer. To obtain the physical properties required for these applications a plasticizer must be added.

Unexpectedly, it has been found that ester plasticizers having a solubility parameter of about 7.8 to about 10.2 $(cal/cc)^{1/2}$ provide improved impact resistance and flexibility. It is surprising that the presence of esters does not prevent the polymerization of dicyclopentadiene, especially where the esters are present at high levels, e.g. up to about 55% by volume of DCPD monomer. In contrast, polymerization is retarded by other materials containing polar functionalities such as alcohols, ethers, ketones and acids. For alcohols and acids, in particular, the amounts that can be tolerated in the polymerization of DCPD is on the order of only parts per million.

Another unexpected feature of ester plasticizers is that they are retained in the polymer network, even at high levels, whereas hydrocarbon oils at high levels show obvious signs of exuding out. One might have expected a hydrocarbon polymer such as poly(DCPD) to have a greater affinity for hydrocarbon plasticizers than for esters, but this is not the case.

BRIEF DESCRIPTION OF THE PREFERRED EMBODIMENTS

This invention encompasses a thermoset polymer comprising polymerized units of DCPD which has incorporated thereinto an ester plasticizer. The ester plasticizer has a solubility parameter of about 7.8 to about 10.2 $(cal/cc)^{1/2}$. Examples of suitable plasticizers include phthalic esters with 2-ethylhexyl phthalate being preferred. The plasticized polymer has a notched Izod impact strength of at least about 5 ft. lb/inch notch at room temperature, a significant improvement over the unplasticized analogue.

The polymer can be synthesized by reacting DCPD with a two part metathesis-catalyst system, at least one part of which contains an ester plasticizer. The first part of the catalyst system is comprised of a metathesis catalyst, preferably $WOCl_4$, $WCl_6$ or a combination of $WCl_6$ plus an alcohol or phenol. The second part of the catalyst system is comprised of an activator such as $SnBu_4$, $AlEt_3$, $AlEt_2Cl$, $AlEtCl_2$, or other alkylaluminum compounds. In a preferred synthesis, the activator is $Et_2AlCl$. Also, the activator containing part may include a small amount of an ether, ketone or nitrile to serve as a moderator to control the rate of polymerization. Examples of suitable moderators are ethyl benzoate and di-n-butyl ether. In a preferred embodiment the two metathesis-catalyst system components, at least one of which contains the ester plasticizer, plus the monomer, form the basis for at least two separate streams which can be mixed in the head of a RIM machine and then injected into a mold where they will quickly set up into a plasticized thermoset polymer.

DETAILED DESCRIPTION OF THE INVENTION

Dicyclopentadiene can be polymerized in such a manner that the resulting product is a thermoset polymer having high impact strength and flexibility. The preferred monomer is commercially available endo-DCPD (3a,4,7,7a-tetrahydro-4,7-methano-1H-indene). The exo-isomer, while not commercially available, can be used just as well. The preferred commercially available material normally has a purity of 96–97%. Commercially available material should be purified in order to prevent impurities from inhibiting the polymerization. The low boiling fraction should be removed. This can be done by stripping away several percent of the unsaturated 4 to 6 carbon atom volatiles, i.e., the volatiles distilled below 100° C. at about 90±3 torr. It is often desirable to purify the starting material even further by treatment with silica gel. Additionally, the water content of the starting material should be below about 100 ppm. The presence of water interferes with polymerization by causing the hydrolysis of both the catalyst and the activator components of the catalyst system. Water can be removed for example, by azeotropic distillation under reduced pressure. Even after these steps the monomer still contains some impurities. It should be understood, therefore, that throughout this description the term polymer refers to the polymer resulting from essentially pure starting material.

The polymerization of the purified DCPD is catalyzed by a two part metathesis-catalyst system. One part contains a tungsten containing catalyst, such as a tungsten halide or tungsten oxyhalide, preferably $WCl_6$ or $WOCl_4$. The other part contains an activator such as $SnBu_4$ or an alkylaluminum compound. The alkylaluminum compound can be an alkylaluminum dihalide or dialkylaluminum halide where the alkyl group contains 1 to 10 carbon atoms. In the preferred activator the alkyl group is ethyl with diethyl aluminum chloride being most preferred.

One part of the catalyst system comprises the tungsten containing catalyst, as described above, preferably in solution with DCPD monomer. The tungsten compound if unmodified, will rapidly polymerize the monomer. Consequently, the tungsten compound should first be suspended in a small amount of a suitable solvent. The solvent must not be susceptible to reacting with tungsten compound. Examples of preferred solvents are benzene, toluene, chlorobenzene, dichlorobenzene, trichlorobenzene and hexane. Sufficient solvent should be added so that the tungsten compound concentration is between about 0.1 and 0.7 mole per liter of solvent.

The tungsten compound can be solubilized by the addition of a small amount of an alcoholic or a phenolic compound. Phenolic compounds are preferred. Suitable phenolic compounds include phenol, alkyl phenols, and halogenated phenols, with tert-butyl phenol, tert-octyl phenol and nonyl phenol being most preferred. The preferred molar ratio of tungsten compound/phenolic compound is from about 1:1 to about 1:3. The tungsten compound/phenolic compound solution can be made by adding the phenolic compound to a tungsten compound/organic solvent slurry, stirring the solution and then blowing a stream of a dry inert gas through the solution to remove the hydrogen chloride which is formed. Alternatively, a phenolic salt, such as a lithium or sodium phenoxide, can be added to a tungsten compound/organic solvent slurry, the mixture stirred until essentially all the tungsten compound is dissolved, and the precipitated inorganic salt removed by filtration or centrifugation. All of these steps should be carried out in the absence of moisture and air to prevent deactivation of the catalyst.

To prevent premature polymerization of the tungsten compound/monomer solution, which would occur within a matter of hours, from about 1 to about 5 moles of a Lewis base or a chelating agent can be added per mole of tungsten compound. Preferred chelants include acetylacetone; alkyl acetoacetates; where the alkyl group contains from 1 to 10 carbon atoms. Preferred Lewis bases are nitriles and ethers such as benzonitrile and tetrahydrofuran. The improvement in the stability and shelf-life of the tungsten compound/monomer solution is obtained whether the complexing agent is added before or after the phenolic compound. When purified DCPD is added to this catalyst solution it forms a solution which is stable and has a shelf-life of several months.

The other part of the metathesis-catalyst system comprises the activator, as described above, preferably in DCPD monomer. The mixture is storage stable and therefore, unlike the tungsten compound/monomer solution, needs no additives to prolong its shelf-life. If, however, an unmodified activator/monomer solution is mixed with the catalyst/monomer solution, the polymerization would initiate instantaneously and the polymer would set up too rapidly. The onset of polymerization can be delayed by adding a moderator to the activator/monomer solution. The plasticizer can serve as the moderator in this process for esters as well as ethers, esters, ketones and nitriles can act as moderators for the metathesis-catalyst system. The preferred ratio of the alkylaluminum to moderator is from about 1:1.5 to about 1:5 on a molar basis.

The polymerization time required for gelation is also temperature dependent. As the temperature at which the reaction is carried out is increased, the reaction rate will also increase. For every eight degree increase in temperature the reaction rate will approximately double. Consequently, to keep the reaction rate controlled at higher reaction temperatures a less active formulation of the metathesis-catalyst system should be used. The precise conditions to be used in a particular situation will be readily determinable by one skilled in the art.

What is ultimately required is that when the catalyst system's components are combined, the resulting DCPD to tungsten compound ratio will be from about 1,000:1 to about 15,000:1 on a molar basis, preferably 2,000:1 and the DCPD to alkylaluminum ratio will be from about 100:1 to about 2,000:1 on a molar basis, preferably from about 200:1 to about 500:1. To illustrate a preferred combination: Sufficient DCPD is added to a 0.1M tungsten containing catalyst solution so that the final tungsten compound concentration is 0.007 molar. This corresponds to a DCPD to tungsten compound ratio of 1,000:1. Sufficient DCPD is added to the $Et_2AlCl$ solution so that the alkylaluminum concentration is 0.048M. This corresponds to a DCPD to alkylaluminum ratio of 150:1. If these two solutions are mixed in a 1:1 ratio, the final ratio of DCPD to tungsten compound will be 2,000:1, the final ratio of DCPD to alkylaluminum will be 300:1 and the final ratio of tungsten compound to alkylaluminum will be about 1:7. The illustrated combination is not the lowest catalyst level at which moldings can be made, but it is a practical level that provides for excess catalyst if impurities in the system consume some of the catalyst components. A higher alkylaluminum level will not only increase costs and residual chlorine levels but may result in a less satisfactory cure. Too low a tungsten compound concentration results in incomplete conversion. A wide range of alkylaluminum activator to tungsten catalyst formulations produce samples which have good out-of-mold properties such as tear resistance, stiffness, residual odor, and surface properties.

In a preferred synthesis, the poly(DCPD) is made and molded with the RIM process. The two parts of the metathesis-catalyst system are each mixed with DCPD, to form two stable solutions which are placed in separate vessels. These vessels provide the source for separate streams. The two streams are combined in the RIM machine's mixing head and then injected into a warm mold where they quickly polymerize into a solid, infusible mass. The invention is not intended to be limited to systems employing two streams each containing monomer. It will be obvious to one skilled in the art that there may be situations where it is desirable to have monomer incorporated in just one stream or to employ more than two streams where the additional streams contain monomer and/or additives.

These streams are completely compatible with conventional RIM equipment. Metathesis-catalyzed polymerizations are known to be inhibited by oxygen so it is necessary to store the components under an inert gas but, surprisingly, it is not necessary to blanket the mold with an inert gas.

The streams are combined in the mixing head of a RIM machine. Turbulent mixing is easy to achieve because the process involves low molecular weight, rapidly diffusing components. Typically the mixing heads have orifices about 0.032 inch in diameter and a jet velocity of about 400 ft/sec. After being combined the mixture is injected into a mold maintained at 35°–100° C., preferably 50°–70° C. The mold pressure is in the range of about 10–50 psi. A rapid exothermic reaction occurs as the poly(DCPD) sets up. The mold can be opened in as little as 20–30 seconds after the combined streams have been injected. In this short time heat removal is not complete and the polymer is hot and flexible. The polymer can be removed from the mold immediately while hot or after cooling. After the polymer has cooled it will become a rigid solid. The total cycle time may be as low as 0.5 minute. Post-curing is desirable but not essential, to bring the samples to their final stable dimensional states, to minimize residual odors, and to improve final physical properties. Post-curing at about 175° C. for about 15 minutes is usually sufficient.

The unplasticized product has a flexural modulus of about 150,000 to 300,000 psi and a notched Izod impact resistance of at least about 1.5 ft. lb/in. notch. The polymer is insoluble in common solvents such as gasoline, naphthas, chlorinated hydrocarbons and aromatics, resistant to flow at temperatures as high as 350° C. and readily releases from the mold.

In accordance with the invention the impact strength can be significantly increased by the addition of an ester plasticizer. While ester plasticizers are well known in the art for use with polar polymers such as polyvinyl chloride, it is surprising that they should be useful with a methathesis-catalyzed thermoset hydrocarbon polymer such as poly(DCPD).

In general, the ester plasticizers have a molecular weight less than 750 and a boiling point higher than 150° C. (760 torr). They can be formed by the combination of a mono- or di-functional carboxylic acid, with a mono- or tri-functional alcohol in one of the following ways: Combination of a di-functional acid with two equivalents of a mono-functional alcohol where the acid can be aliphatic or aromatic and should contain from 2 to 15 carbon atoms and where the alcohol is aliphatic or aromatic and should contain from 1 to 15 carbons, i.e. di(2-ethylhexyl) phthalate, di(2-ethylhexyl) adipate, butyl benzyl phthalate, di-n-butyl sebacate; or combination of three equivalents of a mono-functional acid with a tri-functional alcohol where the alcohol would typically be glycerol and where the acid can be of a single type or a mixture of saturated or unsaturated carboxylic acids having from 1 to 30 carbons, i.e. palmitic, oleic, linoleic, or butyric acids.

It has been found that the most useful ester plasticizers are those that have a solubility parameter in the range of 7.8 to 10.2 (cal/cc)$^{1/2}$. This is the range that is most compatible with poly(DCPD) which has a solubility parameter of 9.3. Solubility parameters are well known in the art. They are discussed, for example, in the Encyclopedia of Chemical Technology, Second Edition, Vol. 15, ppg. 730–733, Kirk-Othmer, Interscience Publishers, New York (1968). The solubility parameter, delta, is a thermodynamic quantity. In its most simplified version is represented by $$\delta^2 = \frac{(H_V - RT)}{V}$$

in which
$H_v$ = the heat of vaporization per mole
$V$ = the molecular volume
$R$ = the gas constant
$T$ = temperature.

In practice the solubility parameters for many esters are available in the literature such as Union Carbide Publication, "Tables of Solubility Parameters", Union Carbide Corporation—Chemicals and Plastics Research and Development Department, Tarrytown, N.Y., May 16, 1975.

In particular, it has been found that diester and glyceride plasticizers having a solubility parameter between about 7.8 and 10.2 (cal/cc)$^{1/2}$ give the best combination of good impact strength and high modulus. Typical of ester plasticizers which can be used are dihexyl phthalate (solubility parameter of 9.7), dioctyl sebacate (solubility parameter of 9.2), dibutyl sebacate (solubility parameter of 9.5), di-n-octyl phthalate (solubility parameter of 9.5), di(2-ethylhexyl) adipate (solubility parameter of 9.2), di(n-octyl) adipate (solubility parameter of 9.3), di(2-ethylhexyl) phthalate (solubility parameter of 9.4), dibutyl phthalate (solubility parameter of 10.2), tracetin (solubility parameter of 10.1), olive oil (solubility parameter of 9.0), tristearin (solubility parameter of 9.0) and cotton seed oil (solubility parameter of 9.0). All solubility parameters were calculated by the method described in Union Carbide Publication, "Tables of Solubility Parameters", Union Carbide Corporation—Chemicals and Plastics Research and Development Department, Tarrytown, N.Y., May 16, 1975.

The amount of plasticizer added to the dicyclopentadiene is not critical. The plasticizer can be present from about 5 pph to about 55 pph based on the volume of DCPD monomer. A preferred amount is between 10 pph and 30 pph by volume. The amount will depend on the particular physical requirement of the polymer to be made and will be readily determinable by one skilled in the art.

Plasticizing poly(DCPD), produced by RIM, presents some difficulties not normally encountered in the use of a plasticizer. Since in the RIM process the polymer is in its final physical form when removed from the mold, it is not possible to add plasticizer to the polymer after molding. It is necessary therefore to add it before molding, i.e. before polymerization. It is therefore imperative that a useful plasticizer in DCPD RIM not interfere with the polymerization of the monomer, even when the plasticizer is present at high levels.

Ester plasticizers do not significantly impede DCPD polymerization, even when added at high levels. Care must be taken, however, to ensure that other polar functionalities such as alcohols, ethers, ketones or acids, are not introduced into the catalyst system since they retard polymerization even when present in amounts less than 1–2%. For alcohols and acids, in particular, the amounts that can be tolerated are on the order of only parts per million. While esters themselves do not impede DCPD polymerization, their hydrolysis products—both alcohols and carboxylic acids—at low levels do. Therefore care must be taken that these products are not present in the catalyst system.

It is important that where the polymer is made via the RIM process that the plasticizer not contain other polar functionalities which will impede polymerization. For instance, low levels of hydroxyl functionalities, i.e. where the plasticizer has a hydroxyl number in the range of 25 to 30 and is present at a concentration of about 20 pph, will prevent polymerization from occurring. The acid and hydroxyl numbers of the plasticizer must be low. Hydroxyl number is a term known in the art. It is the number of milligrams of KOH which will react with the amount of acid necessary to esterify 1 gram of sample. Similarly the acid number of a polymer is the milligrams of potassium hydroxide to neutralize one gram of the sample. The sum of the two must be less than about 15.

The polymer can be modified by the incorporation of up to about 10% of another monomer, such as norbornene. The polymer can also be modified by the addition of fillers or elastomers.

The invention is illustrated by the following examples but it is not to be limited thereby.

Examples 1–4

120 ml of DCPD was purified by vacuum distillation and passing through a molecular sieve and neutral alumina. Three different plasticizers, di(2-ethylhexyl)phthalate (hereinafter referred to as DOP), di(2-ethylhexyl)terephthalate (hereinafter referred to as DOTP), and di(2-ethylhexyl) adipate (hereinafter referred to as DOA) were purified by passing 6 ml of each through a molecular sieve and neutral alumina. All reagents were stored in capped glass bottles under dry nitrogen. Syringes were always clean, dry and flushed with nitrogen prior to use. A slight positive nitrogen pressure in the capped bottles facilitated the removal of reagents.

Into three small capped glass tubes which had been flushed with dry nitrogen, 30 ml DCPD and 6 ml of DOP, DOTP or DOA respectively, were syringed. The DCPD was conveniently transferred after it had been warmed gently above its melting point of 32° C. After the DCPD and plasticizer were mixed, they were allowed to come to room temperature, whereupon 0.6 ml, 25% diethylaluminum chloride (hereinafter referred to as DEAC), by weight in toluene, was added and the mixture shaken. Next, a vacuum line was admitted to each bottle. The bottle was then evacuated and its contents shaken under vacuum for about a minute. The bottle was repressurized with dry nitrogen before subsequent components were added.

A catalyst solution was prepared by weighing 10 grams of pure $WCl_6$ into a bottle under dry nitrogen in a glove bag. The bottle was capped in the glove bag and then removed. A solution of 3.97 g of 4-tert-butylphenol in 250 ml of dry toluene (distilled over sodium) was transferred into the bottle containing $WCl_6$. This mixture was purged of evolved HCl gas by bubbling dry nitrogen through the bottle for one hour.

A control was made in the same manner as were the mixtures as the plasticized examples except that, instead of an ester plasticizer, 0.5 ml of tetrahydrofuran (hereinafter referred to as THF) was added to the DCPD after degassing.

1.2 ml of the catalyst solution was added to each of the four mixtures and then they were shaken. Each mixture was quickly removed from the bottle by syringe and injected into a mold. The mold was made by sandwiching a ⅛ inch thick sheet of teflon, with a rectangular hole in it (8.5 cm × 10 cm), between two ⅛ inch thick aluminum plates (15 cm × 18 cm), and clamping the plates together so as to give a leak free container. The teflon sheet was cut to enclose contained material on all four sides, with the exception of a narrow channel cut to the outside of the mold. The channel was made just large enough to admit a syringe and permit outflow of the displaced gas as the mold was filled.

Each polymerization mixture was syringed into a mold under nitrogen in a glove bag. The filled mold assembly was transferred to an oven preheated to 60°–90° C. Polymerization was completed within a few minutes and gives a ⅛ inch thick plaque of plasticized poly(DCPD). The mold was left in the oven for 45–60 minutes to ensure complete reaction. After demolding, the plastic samples were given a post-cure treatment to remove residual traces of monomer. They were placed in a nitrogen filled oven at 130°–140° C. for one hour. The dynamic mechanical anlaysis and thermal analysis of the four samples were determined and are recorded in Table 1. These analyses are common measures of the effectiveness of a plasticizer for they are indicative of the degree to which the glass transition temperature (Tg) of the polymer has been lowered. The temperatures for the maximum value of the tangent of gamma were obtained using the Rheometrics Mechanical Spectrometer produced by Rheometrics, Inc., Union, N.J. The Tg values were obtained using a differential scanning calorimeter.

TABLE 1

| Example | Plasticizer (at 20 pph by volume) | Dynamic Mechanical Analysis - Maximum of tan γ(°C.) | Thermal Analysis Tg (°C.) |
|---------|-----------------------------------|-----------------------------------------------------|---------------------------|
| 1 | None | 81 | 60 |
| 2 | DOP | 46 | 47 |
| 3 | DOA | 55 | 49 |
| 4 | DOTP | ·56 | 42 |

Examples 5–8

The procedure followed was the same as that in Examples 1–4, except that the amounts of the various components differed. To form a control and three plasticized mixtures, 10 ml of DCPD was combined with no plasticizer, 2 ml of DOP, DOA, or DOTP; 0.1 ml THF; 0.2 ml 25% DEAC and 0.14 ml of the catalyst solution described in Examples 1–4. The mixtures were deaerated (after the DCPD was combined with plasticizer, where there was a plasticizer) before the addition of THF or the catalyst components. The mixture was injected into a chrome plated mold having interior dimensions about 5"×4"×35 mils. The mold was placed in an oven at 100° C. for one-half hour. After demolding, the samples were given no post-cure treatment. Various tensile tests were pre-formed and the results are recorded in Table 2. The strength, elongation and modulus values were obtained by the method described in ASTM D638. The tensile impact values were obtained by the method described in ASTM D1822, modified as described by P. I. Donnelly and R. H. Ralston, Applied Polymer Symposia 5, 71–83 (1965), published by John Wiley & Sons.

TABLE 2

| Example | Plasticizer (20 pph, by volume) | Tensil Impact Test Break Energy-ft. lb/in² | Tensile Test Strength (psi) | Elongation (%) | Modulus (psi) |
| --- | --- | --- | --- | --- | --- |
| 5 | None | 47 | 6,000 | 50 | 191,000 |
| 6 | DOP | 132 | 3,700 | 130 | 96,000 |
| 7 | DOA | 100 | 2,730 | 120 | 76,000 |
| 8 | DOTP | 100 | 3,500 | 120 | 66,000 |

Examples 9–11

Mixtures of DOP and DCPD were prepared as outlined in Examples 2–4, in the proportions shown in Table 3. The mixtures were deaerated according to the procedure of Examples 2–4. 0.2 ml THF was added, after deaerating, to the mixture with 20 pph DOP. The THF was added in order to moderate the polymerization rate. After deaerating, 0.4 ml of 25% DEAC and 1.2 ml of the catalyst solution described in Examples 1–4 were added in that order, with thorough shaking after the addition of each component. The same mold was used as in Examples 1–4. The mold was put in an oven at 80° C.±7° C. for 20 minutes. No post-cure treatment was given to the plaques after demolding. Notched Izod Impact values obtained in accordance with the method of ASTM D256 were obtained for each example and are reported in Table 3.

TABLE 3

| Example | DCPD (ml) | DOP (ml) | pph DOP (by Volume) | Notched Izod (ft. lb./in. notch) |
| --- | --- | --- | --- | --- |
| 9 | 30 | 6 | 20 | 21 |
| 10 | 30 | 12 | 40 | 15 |
| 11 | 30 | 16.5 | 55 | 13 |
| 12 | 30 | 21 | 70 | 12 |

Examples 12–20

The procedure followed was the same as that in Examples 1–4 except that in Examples 12–15 the amount of DOP was varied and in Examples 16–20 the amount of butylbenzyl phthalate (hereinafter referred to as BBP) was varied. The amount of DCPD and plasticizer used are detailed in Table 4. Flexural modulus and flexural strength were obtained in accordance with the method of ASTM D790 and are shown in Table 4 along with the corresponding notched Izod Impact values.

TABLE 4

| Example | DCPD (ml) | DOP (ml) | BBP (ml) | pph Plasticizer (by volume) | Flexural Modulus (psi) | Flexural Strength (psi) | Notched Izod (ft. lb./in. notch) |
| --- | --- | --- | --- | --- | --- | --- | --- |
| 12 | 30 | — | — | — | 315,000 | 8,400 | 1.7 |
| 13 | 30 | 6 | — | 20 | 120,000 | 3,560 | 21 |
| 14 | 30 | 7.5 | — | 25 | 110,000 | 2,980 | — |
| 15 | 30 | 9 | — | 30 | 58,00 | 1,740 | 20 |
| 16 | 30 | 12 | — | 40 | 45,000 | 1,390 | 17 |
| 17 | 30 | — | 4.5 | 15 | 220,000 | 6,180 | — |
| 18 | 30 | — | 6 | 20 | 150,000 | 4,300 | 18 |
| 19 | 30 | — | 9 | 30 | 107,000 | 3,070 | 19 |
| 20 | 30 | — | 12 | 40 | 93,000 | 2,730 | 18 |

I claim and desire to have protected by a Letters Patent:

1. A method for making a thermoset polymer comprising polymerized units of dicyclopentadiene comprising: first, combining a plurality of reactant streams, one of which contains the activator of a methathesis-catalyst system, and a second, which contains a catalyst of said methathesis-catalyst system, and at least one of which contains dicyclopentadiene, and another monomer in a amount of up to about ten percent and at least one of which contains an ester plasticizer having a solubility parameter of from 7.8 to about 10.2 to form a reaction mixture and then immediately injecting the reaction mixture into a mold where polymerization occurs.

2. The method in accordance with claim 1, wherein the ester plasticizer is selected from the group consisting of diethyl phthalate, dihexyl phthalate, dioctyl sebacate, dibutyl sebacate, di-n-octyl phthalate, di(2-ethylhexyl) adipate, di(n-octyl) adipate, di(2-ethylhexyl) phthalate, and dibutyl phthalate.

3. The method in accordance with claim 1, wherein the ester plasticizer is present in an amount between about 10 pph and 30 pph based on the volume of the dicyclopentadiene.

4. A thermoset polymer of polymerized units of dicyclopentadiene and another monomer in an amount of up to about ten percent, said polymer having incorporated therein an ester plasticizer, where said plasticizer has a solubility parameter from 7.8 to about 10.2 (cal/cc)$^{1/2}$.

5. The thermoset polymer of claim 4, wherein the ester plasticizer is selected from the group consisting of dihexyl phthalate, dioctyl sebacate, dibutyl sebacate, di-n-octyl phthalate, di(2-ethylhexyl) adipate, di(n-octyl) adipate, di(2-ethylhexyl) phthalate, and dibutyl phthalate.

6. The thermoset polymer of claim 4, where the ester plasticizer is present in an amount between about 10 pph and 30 pph based on the volume of the dicyclopentadiene.

7. The method of claim 1 wherein said monomer is norbornene.

8. The polymer of claim 4 wherein said monomer is norbornene.

* * * * *